United States Patent
Gavrilin et al.

(10) Patent No.: US 11,215,310 B2
(45) Date of Patent: Jan. 4, 2022

(54) DECONTAMINATION BATH ELECTRICAL HEATING DEVICE

(71) Applicants: JOINT STOCK COMPANY EXPERIMENTAL AND DESIGN ORGANIZATION "GIDROPRESS", Podolsk (RU); JOINT STOCK COMPANY "SCIENCE AND INNOVATIONS" ("SCIENCE AND INNOVATIONS", JSC), Moscow (RU)

(72) Inventors: Viktor Alekseevich Gavrilin, Moskovskaya obl. (RU); Aleksandr Nikolaevich Strebnev, Moskovskaya obl. (RU)

(73) Assignees: JOINT STOCK COMPANY "EXPERIMENTAL AND DESIGN ORGANIZATION "GIDROPRESS" AWARDED THE ORDER OF THE RED BANNER OF LABOUR AND CZSR ORDER OF LABOUR", Moskovskaya Obl. Podolsk (RU); JOINT STOCK COMPANY "SCIENCE AND INNOVATIONS" ("SCIENCE AND INNOVATIONS", JSC), Moscow (RU)

( * ) Notice: Subject to any disclaimer, the term of this patent is extended or adjusted under 35 U.S.C. 154(b) by 0 days.

(21) Appl. No.: 16/089,843

(22) PCT Filed: Oct. 27, 2017

(86) PCT No.: PCT/RU2017/000797
§ 371 (c)(1),
(2) Date: Sep. 28, 2018

(87) PCT Pub. No.: WO2018/080345
PCT Pub. Date: Mar. 3, 2018

(65) Prior Publication Data
US 2019/0257461 A1    Aug. 22, 2019

(30) Foreign Application Priority Data
Oct. 28, 2016 (RU) .......................... RU2016142508

(51) Int. Cl.
*F16L 53/38* (2018.01)
*H05B 3/58* (2006.01)
*H05B 3/26* (2006.01)

(52) U.S. Cl.
CPC ............... *F16L 53/38* (2018.01); *H05B 3/58* (2013.01); *H05B 3/26* (2013.01)

(58) Field of Classification Search
CPC .. F16L 53/38; H05B 3/26; H05B 3/58; H05B 3/82; H05B 1/02; H05B 1/0269; H05B 3/0052; H05B 3/78; H05H 1/0247
(Continued)

(56) References Cited

U.S. PATENT DOCUMENTS 5,011,329 A * 4/1991 Nelson .................... B09C 1/06
                                                  405/128.65
5,190,405 A * 3/1993 Vinegar .................. B09C 1/005
                                                  405/128.4

(Continued)

*Primary Examiner* — Ibrahime A Abraham
*Assistant Examiner* — Chris Q Liu
(74) *Attorney, Agent, or Firm* — Brandon V. Zuniga; James R. Gourley; Carstens & Cahoon, LLP

(57) ABSTRACT

A bath electrical heating device for deactivation designed to provide heating of bath deactivation and the deactivating solution in it before deactivation of reactor facility equipment and ensuring the removal of excess heat in the process of deactivation. The invention improves reliability, reduces the material consumption of the device and simplifies the structure installation and repair. The device performs at least (Continued)

Decontamination Bath Electrical Heating Device from three heat insulation blocks in the form of coaxial metal screens, installed with an air gap from the heater. The heater with current leads is made in hermetic perform, each heat insulation blocks supplemented with an air-gap coaxial metal protective casing. The air gap of which in the upper part is covered with a cap with a visor whose diameter exceeds the external diameter of the protective casing, wherein solid cover of the upper protective casing install a sealed coupling.

1 Claim, 1 Drawing Sheet

(58) Field of Classification Search
USPC ....... 219/535, 544, 494, 528, 553, 201, 204,
219/476, 521, 526, 541, 543, 549, 202,
219/213, 482, 531, 536, 540, 643, 209,
219/217, 219, 228, 229, 243, 260, 262,
219/385, 492, 497, 505, 506, 507, 516,
219/529, 530, 533, 534, 538, 539, 542,
219/548

See application file for complete search history.

(56) References Cited

U.S. PATENT DOCUMENTS

| | | | | |
|---|---|---|---|---|
| 5,251,700 A | * | 10/1993 | Nelson | B09C 1/06 166/305.1 |
| 5,325,795 A | * | 7/1994 | Nelson | B09C 1/06 110/204 |
| 2003/0142964 A1 | * | 7/2003 | Wellington | E21B 43/30 392/301 |
| 2004/0120771 A1 | * | 6/2004 | Vinegar | B01D 53/002 405/128.4 |
| 2004/0126190 A1 | * | 7/2004 | Stegemeier | B09C 1/06 405/128.6 |
| 2013/0256113 A1 | * | 10/2013 | Tumiatti | C10G 2/30 201/19 |
| 2016/0307652 A1 | * | 10/2016 | Arlaud | G21C 7/20 |

* cited by examiner

Decontamination Bath Electrical Heating Device
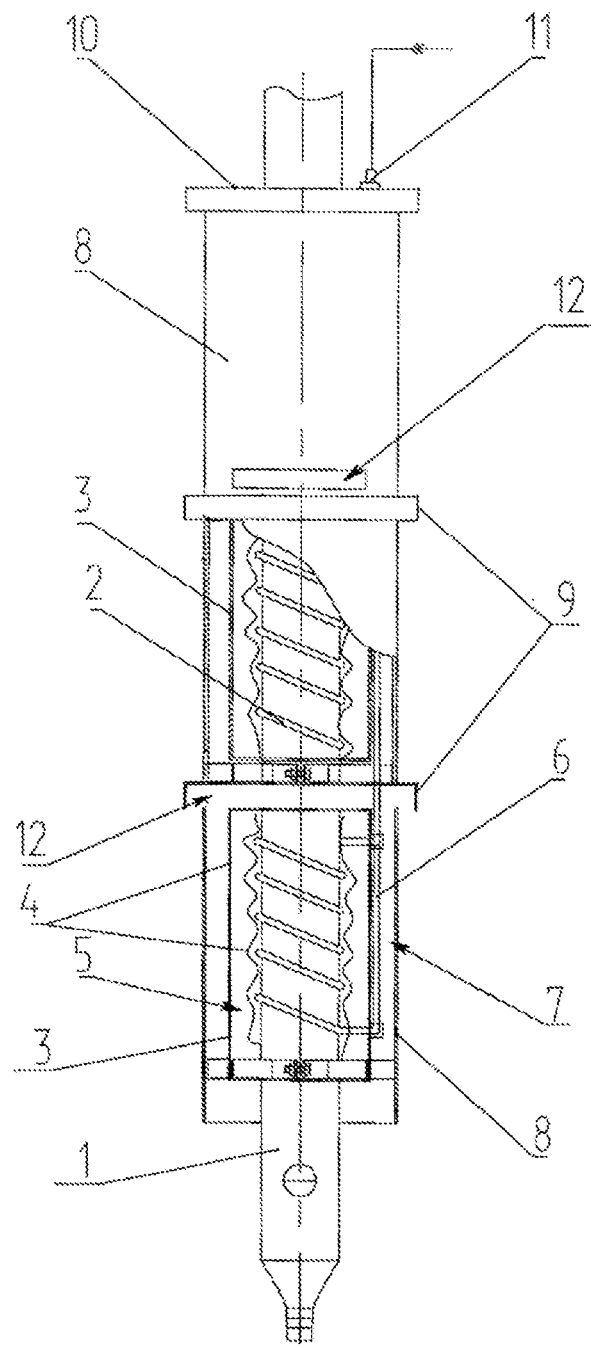

DECONTAMINATION BATH ELECTRICAL HEATING DEVICE

CROSS-REFERENCE TO RELATED APPLICATIONS

This application is a US 371 Application from PCT/RU2017/000797 filed Oct. 27, 2017, which claims priority to Russia Application 2016142508 filed Oct. 28, 2016, the technical disclosures of which are hereby incorporated herein by reference.

The invention belongs in the nuclear power industry, in particular, to the reactor unit electrical equipment with a water-water energetic reactor (RU with WWER). In general case, the decontamination bath electrical heating device is intended for heating the decontamination bath and the decontaminating solution contained therein before decontamination of the RU equipment and for excessive heat removal in the process of the RU equipment decontamination.

The prior art is a technical solution disclosing the pipeline thermal insulation method at which the pipeline thermal insulation is provided through weakening the radiant heat exchange by screens (RF Patent No. 2219425, IPC F 16L 59/06, priority 20 Nov. 2002).

Disadvantages of this device are as follows:
complexity of organization of a great number of closed air pockets;
absence of electrical heating elements;
complexity of the device installation and repair;
absence of a possibility for excessive heat removal.

The most similar in the technical essence is the device (Patent "Pipeline heater", utility model 38214 Ul, F 16L 53/00, application: 2003128914/20, 29 Sep. 2003, published on 27 May 2004), which contains the sectional units located on the pipeline external surface and replicating its profile, filled with the heat-insulating material, on the internal wall of which the electrical heating elements with current conducting wires are located; at that, the electrical heating element is made of a wire with a high specific electric resistance, equipped with the insulating elements.

Disadvantages of the prior art taken as a prototype are as follows:
high material consumption of the article;
danger of the heater short-circuit to ground in case of decontaminating solution spillage;
complexity (impossibility) of thermal insulation decontamination in case of decontaminating solution spillage;
absence of a possibility for excessive heat removal.

The mentioned disadvantages are conditioned by that the hygroscopic materials are used as the thermal insulation, the ceramic insulators are used as the electrical insulation, besides, the structure does not provide excessive heat removal in the process of the RU equipment decontamination.

The mentioned disadvantages are eliminated by the claimed device.

The object of the invention is to create an electric heating device for the RU equipment decontamination bath, featuring process parameters and safety of the operating personnel in the course of the RU equipment decontamination.

The technical result of the invention is reliability improvement, reduction in consumption of materials for the device and simplification of the device installation and repair. The other technical result is provision of a possibility for the device decontamination.

The technical result is achieved through that it is proposed to make the decontamination bath electrical heating device, vertical type, containing the heater located on the external surface of the bath and made of a wire with a high specific electric resistance, with current conducting wires and connecting couplings, and thermal insulation units, as a device consisting of at least three thermal insulation units made in the form of coaxial metal screens installed with an air gap from the heater; the heater with current conducting wires shall be made leak-tight; each thermal insulation unit shall be complete with a coaxial metal protective shell installed with an air gap which is closed in the upper part with a baffle the diameter of which exceeds the external diameter of the protective shell; at that, installed on the cover of the upper protective shell shall be the leak-tight connecting coupling; besides, through holes are made in the upper and lower parts of the side surface of the protective shell, the total area of the holes must be equal or more than the cross-section area of the air gap between the external screen and the protective shell.

The essence of the invention is explained by the drawing. FIG. 1 shows the general view of the decontamination bath 1 of vertical type. The leak-tight heater 2, for example, made of heat-resistant cable KNMSNKh-N as per TU16.K03-43-2006, shall be mounted onto the decontamination bath 1. Thermal insulation of the heater 2 is made in the form of units 3 of coaxial metal screens 4, for example, made of thin-sheeted corrosion-resistant steel 08Kh18N10T as per GOST 5582-75, which are installed with an air gap 5. The leak-tight current-conducting wires 6 are installed on the external surface of the screen 4. Each thermal insulation unit 3 is equipped with the coaxial metal protective shell 8 installed with an air gap 7, the air gap 7 of the protective shell 8 in the upper part is closed with a baffle 9 the diameter of which exceeds the external diameter of the protective shell 8; at that, the leak-tight connecting coupling 11 is installed on the cover 10 of the upper protective shell 8. Besides, through holes 12 are made in the upper and lower parts of the side surface of the protective shell 8, the total area of the holes must be not less than the cross-section area of the air gap between the external screen 4 and the protective shell 8.

The device mounting begins with the installation of the heater 2; then the internal screens 4 of the thermal insulation units 3 are mounted; then electric wiring is laid and the external protective shell 8 is installed. In the process of preparation for work the heater 2 and the thermal insulation units 3 shall provide the initial warming-up of the decontaminating solution and the decontamination bath 1. Due to selection of a number of screens 4 and a value of the air gap 5 the required temperature of the thermal insulation unit 3 surface is achieved. The leak-tightness of the heater 2, the current-carrying wire 6 and the connecting coupling 11 excludes a possibility of short-circuit in case of possible spillage of the decontaminating solution. Since the outer diameter of the baffle 9 exceeds the external diameter of the protective shell 8, a possibility of the decontaminating solution ingress into the device internal pocket is also excluded. In the process of the RU equipment decontamination the excessive heat is removed from the decontamination bath 1 through the holes 12 due to air circulation between the thermal insulation unit 3 and the protective shell 8. Through selection of a value of the air gap 7 the decrease in the protective shell 8 temperature is achieved in order to provide safety of the operating personnel in the process of the RU equipment decontamination. All materials used in the device make it possible to carry out decontamination in case of the decontaminating solution spillage.

So, the use of the applied technical solution as compared to the known devices provides the device reliability improvement: materials consumption has been decreased; installation and repair of the device has been simplified; a possibility of the device decontamination is provided, if necessary; the initial warming-up of the equipment through weakening the radiant heat exchange between screens is provided; the removal of excessive heat in the process of decontamination due to air circulation between the thermal insulation unit and the protective shell is provided.

The invention claimed is:

1. An electrical heating device for a vertical decontamination bath, the device comprising
   a heater,
   at least three thermal insulation units, and
   a coaxial metal protective shell;
   wherein the heater is configured to be located on an outer surface of the decontamination bath;
   wherein the heater comprises a wire having electric resistance, current conducting wires, and connecting couplings;
   wherein the at least three thermal insulation units comprise coaxial metal screens mounted with a first air gap from the heater;
   wherein the heater and the current conducting wires are leak-tight;
   wherein each of the thermal insulation units is provided with a surrounding portion of the coaxial metal protective shell;
   wherein an upper part of a second air gap between each of the thermal insulation units and the coaxial metal protective shell is closed with a baffle;
   wherein a diameter of the baffle exceeds an external diameter of coaxial metal protective shell;
   wherein a leak-tight connecting coupling is installed in a cover of an upper part of the coaxial metal protective shell; and
   wherein through holes are provided in an upper part and a lower part of the coaxial metal protective shell, and a total area of the through holes is equal to or greater than a cross-section area of the second air gap between one of the thermal insulation units and the coaxial metal protective shell.

* * * * *